US012785584B2

(12) United States Patent
Jiang et al.

(10) Patent No.: US 12,785,584 B2
(45) Date of Patent: Nov. 3, 2026

(54) HYSTERESIS CURRENT CONTROL FOR MODULAR MULTILEVEL CONVERTERS USING ACCELERATION SLOPE

(71) Applicant: University of Manitoba, Winnipeg (CA)

(72) Inventors: Chen Jiang, Winnipeg (CA); Aniruddha M. Gole, Winnipeg (CA)

(73) Assignee: University of Manitoba, Winnipeg (CA)

( * ) Notice: Subject to any disclaimer, the term of this patent is extended or adjusted under 35 U.S.C. 154(b) by 212 days.

(21) Appl. No.: 18/653,462

(22) Filed: May 2, 2024

(65) Prior Publication Data

US 2024/0388220 A1 Nov. 21, 2024

Related U.S. Application Data

(60) Provisional application No. 63/502,189, filed on May 15, 2023.

(51) Int. Cl.
*H02M 7/483* (2007.01)
*H02M 1/00* (2007.01)
*H02M 1/12* (2006.01)

(52) U.S. Cl.
CPC ....... *H02M 7/4835* (2021.05); *H02M 1/0025* (2021.05); *H02M 1/0054* (2021.05); *H02M 1/12* (2013.01)

(58) Field of Classification Search
CPC ...... H02M 7/483; H02M 7/4835; H02M 1/12; H02M 1/0054; H02M 1/0025; H02J 3/36; H02J 2003/365; H02J 3/01
See application file for complete search history.

(56) References Cited

U.S. PATENT DOCUMENTS

| | | | | |
|---|---|---|---|---|
| 10,205,402 | B2 * | 2/2019 | Fujii | H02M 1/12 |
| 12,142,999 | B2 * | 11/2024 | Radhakrishnan | G01K 1/024 |
| 2015/0171726 | A1 * | 6/2015 | Singh Riar | H02M 7/797 363/65 |
| 2017/0141571 | A1 * | 5/2017 | Wong | H02J 3/01 |
| 2018/0309379 | A1 * | 10/2018 | Basic | H02M 1/15 |
| 2020/0295654 | A1 * | 9/2020 | Weiss | H02M 3/04 |

(Continued)

FOREIGN PATENT DOCUMENTS

CN 105356778 A * 2/2016

*Primary Examiner* — Gustavo A Rosario-Benitez
(74) *Attorney, Agent, or Firm* — Kyle R Satterthwaite; Ryan W Dupuis; Ade & Company

(57) ABSTRACT

Novel methodology and controller for hysteresis current control in modular multilevel converters (MMCs). With this novel acceleration slope-based hysteresis current control, the MMC can behave as a high-bandwidth and high-precision current source with much reduced power loss in comparison with the two-level voltage source converter (VSC) with traditional hysteresis current control. At regular sampling intervals, a value of the outputted AC current signal is compared against a prescribed range whose upper and lower limits straddle a reference current signal to which the outputted AC current signal is to be conformed. If the measured value is above or below the range, a current/time slope of the reference current is decreased or increased, respectively, to modify a reference voltage to be imparted at the output port of the MMC to control the outputted AC current signal.

12 Claims, 10 Drawing Sheets

(56) References Cited

U.S. PATENT DOCUMENTS

| | | | | |
|---|---|---|---|---|
| 2022/0397616 | A1* | 12/2022 | Nakayama | H02M 7/483 |
| 2023/0198379 | A1* | 6/2023 | Johannesson | H02M 1/325<br>363/35 |
| 2023/0396186 | A1* | 12/2023 | Slepchenkov | H02M 7/483 |
| 2024/0305194 | A1* | 9/2024 | Anderson | H02M 1/0009 |

* cited by examiner

FIG. 3A
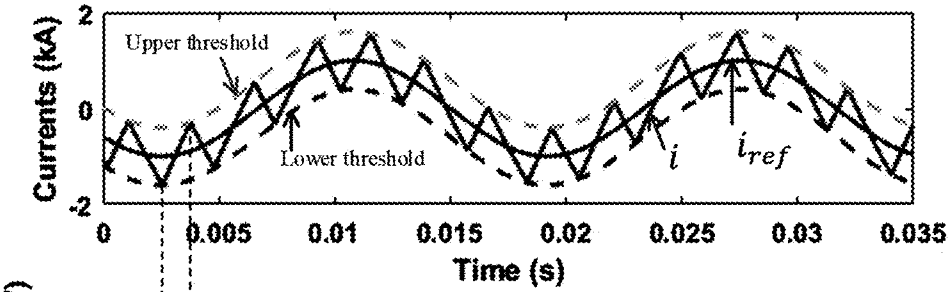
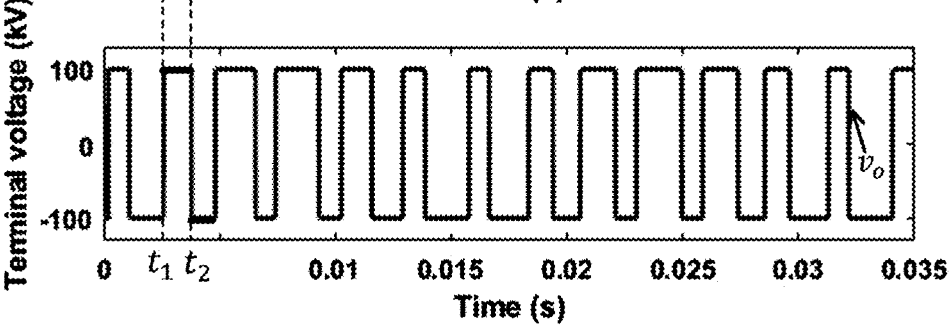
FIG. 3B
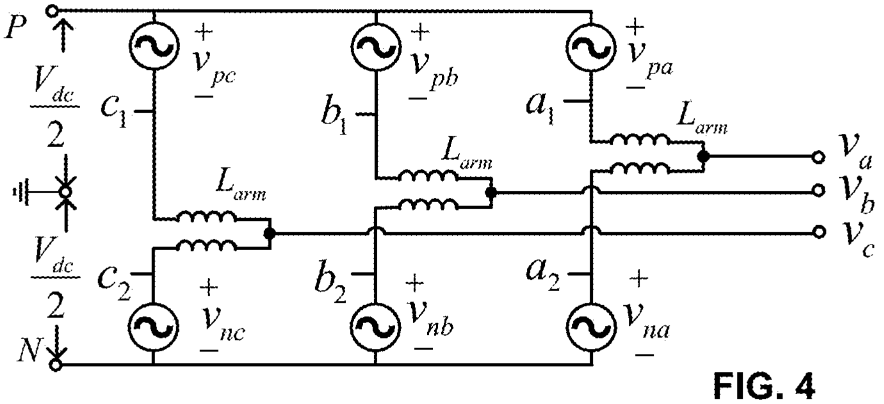
FIG. 4
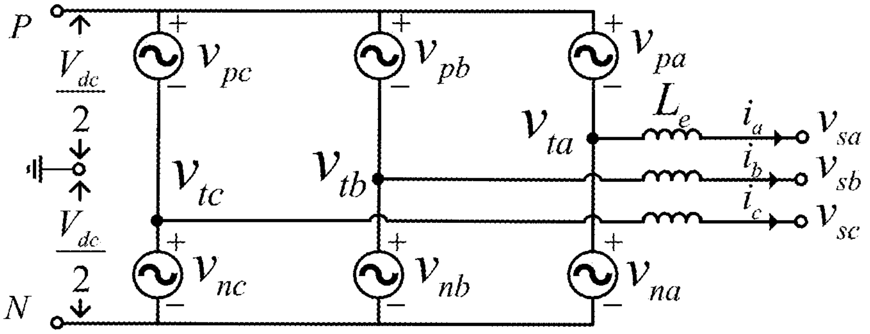
FIG. 5A

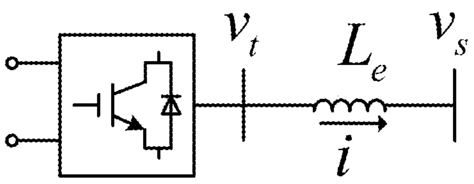
FIG. 5B
FIG. 6A
FIG. 6B
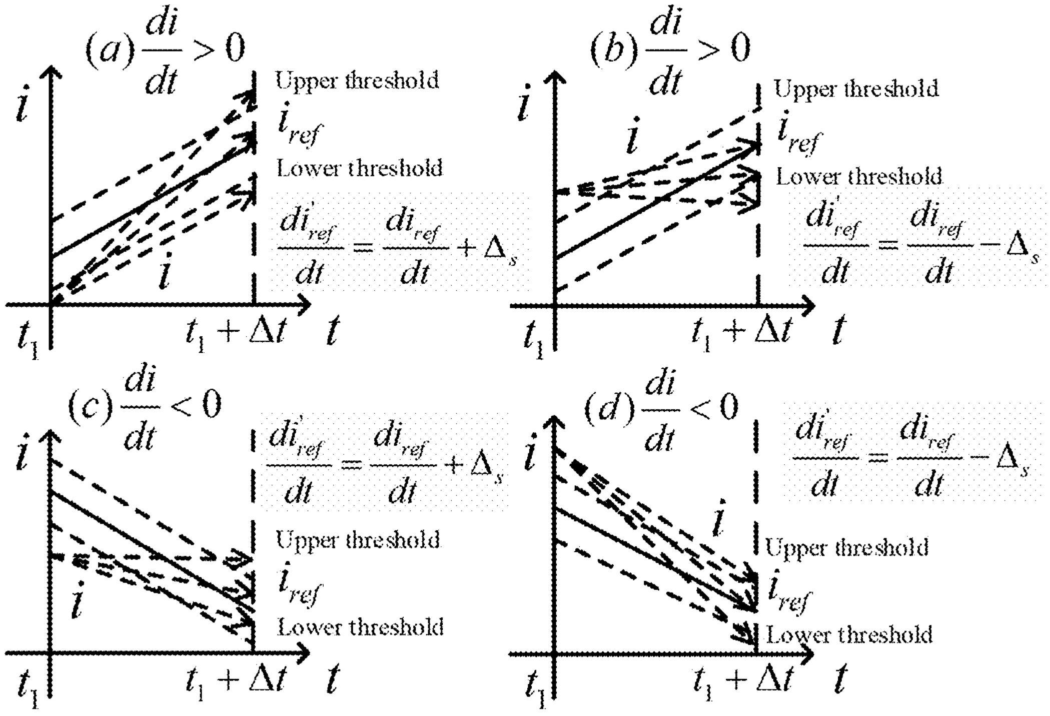
FIG. 6C
FIG. 6D
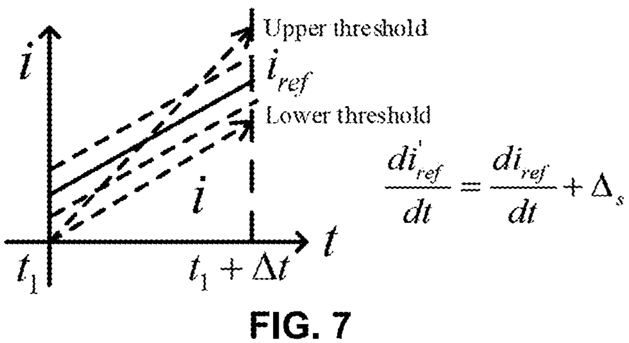
FIG. 7

FIG. 18A
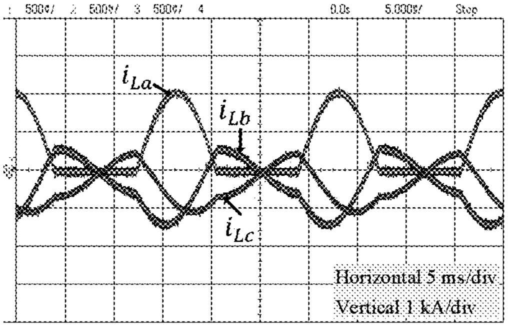
FIG. 18B
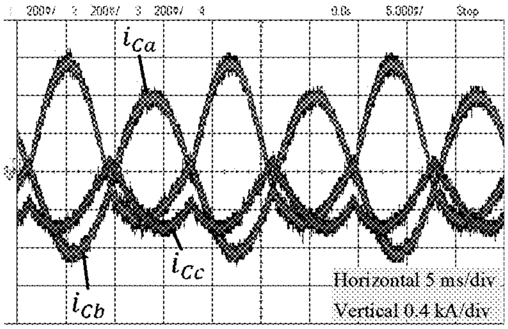
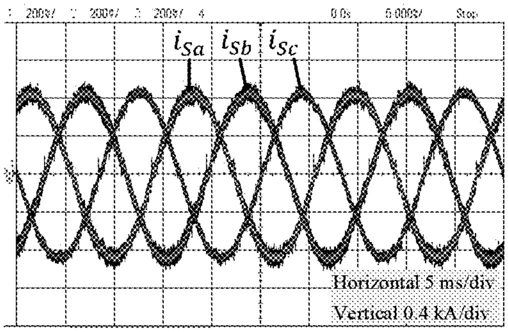
FIG. 18C

HYSTERESIS CURRENT CONTROL FOR MODULAR MULTILEVEL CONVERTERS USING ACCELERATION SLOPE

FIELD OF THE INVENTION

The present invention relates generally to voltage source converters used in modern power networks, and more particularly to modular multilevel converters and novel improvements thereto.

BACKGROUND

The voltage source converter (VSC) is a widely utilized solution in modern power networks, used in a variety of applications ranging from high voltage direct current (HVdc) transmission [1]-[2], to static synchronous compensators [3] and battery energy storage systems [4]. Compared with the traditional line commutated converter (LCC), the VSC does not require reactive power support from the grid. Also, the active and reactive powers can be controlled in a decoupled manner [5]-[6]. The VSC can be operated when connected to a weak grid or even a dead load with no local generation.

Traditionally, the VSC structure was either a two-level or three-level type. In the last decade or so, the modular multilevel converter (MMC) proposed by R. Marquardt et al [7] is fast becoming the preferred VSC topology. The schematic diagram of a one-phase MMC is shown in FIG. 1(*a*). The MMC has an upper and a lower arm, each with a stack of identical submodules. Each submodule consists of a capacitor which can be connected across the submodule terminals or bypassed depending on which one of a complementary pair of insulated-gate bipolar transistors (IGBTs) is on. Thus, the output voltage of the submodule ($V_{SM}$) is either the capacitor voltage ($V_c$) or zero.

By appropriately adding or bypassing submodules, a near-sinusoidal waveform can be synthesized as shown in FIG. 1(*b*). With a large number of levels, the stepped output waveform can be made to closely follow a sinewave, thereby eliminating any filter requirement [8]. Also, with a properly designed MMC, each submodule is switched on or off infrequently in one cycle, and the change in voltage at its terminals is simply the module voltage and not the entire dc voltage (as is the case for the 2-level topology). This significantly decreases the switching losses of the converter. Additionally, the modular structure of the MMC makes it highly adaptable to different voltage levels. For a higher voltage system, one need is simply to add additional submodules in each arm, without redesigning the submodule for a different voltage rating.

Due to the advantages mentioned above, the MMC is now widely used in applications such as HVdc transmission [9], variable-speed drives [10], renewable energy generators [11], flexible alternating current transmission systems (FACTS) [12], and so on. It has, however, not been widely used in the active power filters (APFs) for arc furnaces and the like due to the erstwhile lack of a precise way of rapidly controlling current. In these applications, the two-level converter has dominated. The inventors of the present application therefore set out to devise a control strategy that would enable an MMC to be used in an APF for harmonic elimination.

A common implementation of a shunt active power filter is shown in FIG. 2. The operating principle of the APF is that it identifies the undesirable component of the load current and injects a canceling component into the grid to offset this

[13]. This is achieved by making the converter behave like a high-bandwidth and high-precision current source. Therefore, it is challenging to implement with an MMC due to its structural complexity. Additionally, a converter-based APF can simultaneously provide reactive power compensation, regulation of terminal voltage, and voltage balancing in three-phase systems.

Current control methods for the VSC can be classified as i) linear and ii) non-linear [14]. In the linear controllers, a voltage order is generated using the proportional-integral (PI) controller. This type of control is more suited for low-bandwidth applications such as reactive power balancing but is too slow for active harmonic filtering or for cleaning up arc furnace current waveforms [15]. For the latter, non-linear controls such as hysteresis current, delta modulation, and space vector are recommended. Space vector control such as the non-linear vector current source (NLVCS) control [16] has more bandwidth in comparison with the linear methods but requires a phase locked loop (PLL) for synchronization, as is mainly suited for active filtering of one or two specific harmonics.

Alternatively, the hysteresis modulation method is popular and has been applied to the multilevel H-bridge converters, diode clamped converters and flying capacitor converters [17]. One of the challenges with hysteresis control is the higher switching power loss, especially in two- or three-level converters, where the output voltage swing at each switching is very large. The MMCs afford the opportunity to have a switching step which is a very small fraction of the step in a two-level converter, and so have the potential for significantly reducing the switching loss. Although MMCs are seeing increasing use in HVdc and other applications, the hysteresis current control for MMCs has not been widely reported.

Accordingly, there remains a need for a new solution to address the foregoing shortcomings of the prior art.

SUMMARY OF THE INVENTION

According to a first aspect of the invention, there is provided a method for controlling a modular multilevel voltage sourced converter (MMC) to form an outputted alternating current (AC) current signal of prescribed form, wherein the MMC is electrically connected at an output port thereof to an input port of an AC electrical power system to facilitate exchange between the MMC and the AC electrical power system of electrical power derived from the outputted AC current signal, the method comprising:

- providing a reference current signal to which the outputted AC current signal is to conform;
- forming, at the output port of the MMC, based on the reference current signal, a voltage signal configured to form the outputted AC current signal;
- measuring the outputted AC current signal at sampling instances separated by uniform time intervals;
- at each one of the sampling instances, comparing a value of the outputted AC current signal to a prescribed range whose upper and lower limits straddle a value of the reference current signal;
- for each one of the sampling instances for which it is found that the value of the outputted current signal lies within the prescribed range, maintaining the voltage signal from a respectively preceding one of the time intervals;
- for each one of the sampling instances for which it is found that the outputted AC current signal is below the lower limit of the prescribed range, increasing a current/time slope of the reference current signal and modifying the voltage signal in accordance therewith;

for each one of the sampling instances for which it is found that the outputted AC current signal exceeds the upper limit of the prescribed range, decreasing the current/time slope of the reference current signal and modifying the voltage signal in accordance therewith.

In brief summary, when the value of the outputted AC current signal lies within the prescribed range, the voltage signal is kept the same or is unchanged from that possessed or established at a preceding one of the sampling instances. That is, when the value of the outputted AC current signal lies within the prescribed range at the respective sampling instance, the voltage signal from the time interval preceding the sample instance is maintained for the upcoming sampling interval to follow the sampling instance.

Typically, time intervals of sufficiently small measure are selected so that slopes of the outputted AC current signal and the reference current signal are considered substantially constant over the time intervals.

Even though bidirectional power flow is possible between the MMC and the AC electrical power system connected thereto, typically, the outputted AC current signal generated by the MMC flows from the MMC to the AC electrical power system which is external thereto.

Typically, the MMC is connected at an input port thereof to a direct current (DC) power source.

The values of the outputted current signal and the reference current signal which are compared are those at the sampling instance.

In some cases, said increasing and said decreasing of the current/time slope of the reference current signal may respectively comprise addition and subtraction of a constant slope deviation value thereto, which constant slope deviation value is applied uniformly among different sampling instances regardless of a magnitude of error between the outputted AC current signal and the reference current signal at said different sampling instances.

In such cases, the constant slope deviation value is a positive non-zero value, preferably not exceeding twice a threshold value of the prescribed range divided by the time interval.

In other cases, said increasing and said decreasing of the current/time slope of the reference current signal respectively may comprise addition and subtraction of a variable slope deviation value thereto, which variable slope deviation value is uniquely calculated for each of said sampling instances for which it is found that the value of the outputted AC current signal is outside the prescribed range.

In such cases, the variable slope deviation value may be proportional to a magnitude of an error between the outputted AC current signal and the reference current signal at the sampling instance. Typically, this error refers to a difference between the values of the outputted AC current signal and the reference current signal.

In such cases, the variable slope deviation value may be equal to a difference calculated by subtracting a threshold value of the prescribed range from an absolute value of said error, which difference is then divided by the time interval.

According to a second aspect of the invention, there is provided a hysteresis current controller for a modular multilevel voltage sourced converter (MMC) that is electrically connected at an output port thereof to an AC electrical power system at an input port thereof to facilitate exchange between the MMC and the AC electrical power system of power derived from an outputted AC current signal, said hysteresis current controller being configured to:

measure the outputted AC current signal at sampling instances separated by uniform time intervals;

at each one of the sampling instances, compare a value of the outputted AC current signal against a prescribed range whose upper and lower limits straddle a reference current signal to which the outputted AC current signal is to be conformed; and for each of said sampling instances for which it is found that the value of the outputted AC current signal is outside the prescribed range, either increase or decrease a current/time slope of the reference current signal according to whether the value of the outputted AC current signal falls below or above the prescribed range, respectively.

The controller is typically implemented digitally, therefore comprising one or more processors and non-transitory computer readable memory that is coupled thereto and stores executable statements and instructions executable by said one or more processors to perform at the least the steps recited in the second aspect of the invention, or the equivalent steps in the first aspect of the invention, and optionally any or all of the other steps contemplated in the above summary and/or in the following detailed description of preferred embodiments.

BRIEF DESCRIPTION OF THE DRAWINGS

Preferred embodiments of the invention will now be described in conjunction with the accompanying drawings in which:

FIG. 3A is a typical current waveform plot showing hysteresis current control for a two-level voltage source converter of the prior art.

FIG. 3B is a terminal voltage waveform plot corresponding to the current waveform plot of FIG. 3A.

FIG. 4 is an equivalent circuit model of a three-phase MMC of the prior art.

FIG. 5A is a simplified version of the equivalent circuit model of FIG. 4, illustrated as a full three phase view thereof.

FIG. 5B is a single line view of the equivalent circuit model of FIG. 5A.

FIGS. 6A through 6D illustrate four possible current change scenarios that can arise any given time interval of operation of the three-phase MMC of FIGS. 4 and 5, where at the start of the time interval, the outputted current of the MMC is outside an acceptable hysteresis range of a reference current signal that the outputted current is intended to conform to, and at the end of the at interval may be above, below or within that threshold range, depending on a slope of the outputted current during that interval.

FIG. 7 schematically illustrates failed (undershot and overshot) correction attempts of the scenario shown in FIG. 6(A) through slope adjustment of the reference current in accordance with the present invention, which failures are attributed to excessive or insufficient increase of the slope in the illustrated instance.

FIGS. 18A, 18B and 18C are waveform plots of the same three phase currents plotted in FIGS. 16A, 16B and 16C, but in this case plotting the results of the experimental validation.

DETAILED DESCRIPTION

Figure 1A:
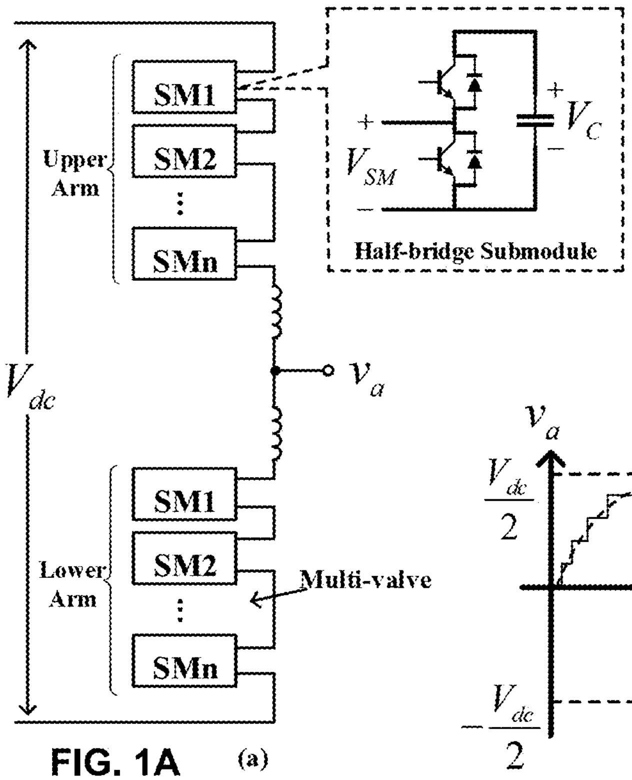
FIG. 1A is a schematic diagram of a one-phase MMC of the prior art.
Figure 1B:
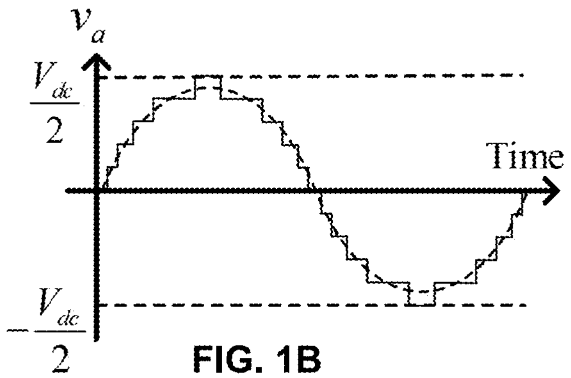
FIG. 1B is a schematic diagram of an output voltage waveform of the MMC of FIG. 1A.
Figure 2:
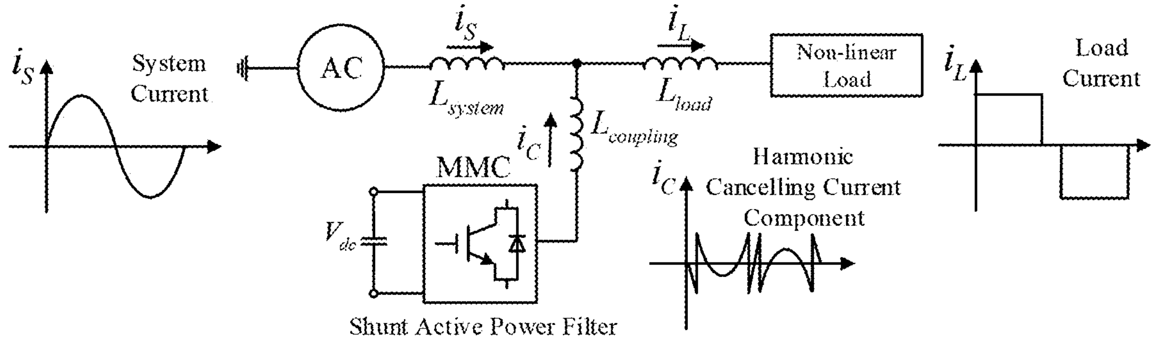
FIG. 2 is a schematic diagram of a novel system of the present invention employing an inventively controlled MMC as a shunt active power filter.

This disclosure begins with reference to traditional hysteresis current control for the two-level VSC and then introduces the novel hysteresis current control method for the MMC using an acceleration slope strategy. This method can be directly applied to MMCs with any number of levels. The effectiveness of the proposed method has been validated using Electromagnetic Transients (EMT) simulation. A method to determine the power loss was used to estimate switching and conduction power loss [18]-[19]. It has been demonstrated that the MMC option can greatly reduce the switching power loss as well as provide an improved output waveform in comparison with the existing hysteresis control for a two-level VSC. An application example of an MMC-based APF has been demonstrated using EMT simulation and was also constructed and tested using a hardware-in-loop (HIL) simulation on a real-time digital simulator (RTDS).

Traditional Hysteresis Control in a Two-level Voltage Source Converter

Hysteresis current control is a popular non-linear control method used for the two-level VSCs. The objective is to keep the output current within a narrow band defined by a lower and upper threshold around the reference current $i_{ref}$ [20]. FIG. 3 shows typical waveforms for a two-level VSC with this known controller implementation. If the actual current i falls below the lower threshold (e.g., as shown at time $t_1$), the output voltage $v_0$ is switched to positive dc rail. As a result, the current increases, and traverses toward the upper threshold. Similarly, $v_0$ is switched to the negative dc voltage when the current breaches the upper threshold (e.g., as shown at time $t_2$). Thus, the current can be regulated within the pre-set envelope. However, only the current direction and not its rate of change is controllable because the two-level VSCs only have two voltage options which are positive or negative dc voltage, and the rate of rise/fall depends on the back emf of the load.

Although the traditional hysteresis control has long been used for two-level converters, it remains to be adapted for the relatively recent MMC. A novel hysteresis current control method for the MMC using an acceleration slope is introduced herein for the first time. With this new control method, the output currents of the MMC can be limited within a pre-set hysteresis band and the change in voltage at each switching will only be a small fraction of the full voltage range, so the corresponding power loss can be much reduced. Furthermore, the slope of the current can also be controlled.

Novel Hysteresis Current Control Using Acceleration Current Slope

The equivalent circuit model of the three-phase MMC structure is shown in FIG. 4. The upper and lower arm submodules are represented by the voltage sources $$\left(v_o^{abc} = [v_{pa}, y_{pb}, v_{pc}]^T, v_n^{abc} = [v_{na}, v_{nb}, v_{nc}]^T\right)$$

and $L_{arm}$ is the arm inductance. The superscript 'abc' denotes a vector of the individual phase [a, b, c] quantities. Reference [21] shows that the voltages $v_{a1}$ and $v_{a2}$ at points $a_1$ and $a_2$ in phase 'a' (and corresponding points $b_1$ and $b_2$ and $c_1$ and $c_2$ on the other arms) are approximately equal.

Therefore, FIG. 4 can be simplified as shown in FIG. 5 by "virtually" connecting these approximate equipotential points ($a_1$&$a_2$, $b_1$&$b_2$, and $c_1$&$c_2$); with $L_e$=$L_{arm}$/2. Let $i^{abc}$ be the measured output currents of the MMC, $$v_s^{abc}$$

represent the measured voltages on the connected external network and $$v_t^{abc}$$

represent the internal output voltages of this simplified MMC model, which can be calculated based on the upper arm voltage ($v_{pk}$) and lower arm voltage ($v_{nk}$) in phase k, as shown in formula (1).

$$v_{tk} = \frac{v_{nk} - v_{pk}}{2} \approx \frac{(N_{nk} - N_{pk}) \times V_{SM}}{2},\ k \in [a, b, c] \tag{1}$$

where, the $N_{pk}$ and $N_{nk}$ are the number of the active submodules of the upper and lower arm in phase 'k' and $V_{SM}$ is the average dc voltage of the submodules.

From the single-line view in FIG. 5(*b*), the relationship between the output current i and voltages $v_t$,$v_s$ is shown in formula (2) below. Assuming that the output current i is able to follow the reference current $i_{ref}$ exactly, the required MMC output voltage $v_t$ to achieve the output current can be estimated by formula (3).

$$L_e \frac{di}{dt} = v_t - v_s \tag{2}$$

$$v_t = v_{ref} = L_e \frac{di_{ref}}{dt} + v_s \tag{3}$$

The novel hysteresis current controller of the present invention is implemented digitally, with a small sampling timestep Δt, which is the interval between successive current measurements (sampling instances). The output voltage adjustments happen only on the integer multiples of Δt. As Δt is small, it is reasonable to consider the slopes of the reference current and the measured system current to be constant during this interval. Similarly, the slope of the current at time t can be approximated as the slope value from the previous timestep. To illustrate this, consider the four situations in FIG. 6. The solid line is the reference current $i_{ref}$, the dashed lines parallel to the solid line denote upper and lower limits of a prescribed hysteresis range, and the dashed arrows of non-parallel relation to the solid and dashed lines correspond to the possible trajectories of output currents i. As in the case of the two-level converter, a corrective action is taken only when the measured output current breaches the lower/upper limits of the prescribed hysteresis range $i_{ref}$±hy, where hy is a threshold value denoting half of the overall hysteresis range.

Four scenarios that can arise when the output current is found to be outside the prescribed hysteresis range at given sampling instance $t_1$ are illustrated in FIG. 6. Due to the discrete sampling timestep Δt, the time t' when the system current equals the threshold may lie inside the interval [$t_1$, $t_1$+Δt]. Thus, at the sampling instant, the output current may marginally fall outside the prescribed hysteresis range. For example, in FIG. 6(*a*), the output current is marginally lesser than the lower limit, i.e., $i<i_{ref}-hy$ at time $t_1$. In this case, the output current should be nudged to rise a little faster than the reference current so that it can get back into the prescribed hysteresis range $i_{ref}$±hy. Hence, a modified reference current $i'_{ref}$ is selected which has a slightly higher rate of change, i.e., $$(di'_{ref}/dt) = (di_{ref}/dt) + \Delta_s,$$

where the slope deviation $\Delta_s$, is a positive number. Depending on the magnitude of the $\Delta_s$, the current at $t_1$+Δt can attain different values as shown by the dashed arrows in FIG. 6(*a*). This process of output current correction can be achieved by making the output voltage $v_t$ of the MMC equal to the voltage reference $v_{ref}$ as given by formula (4).

$$v_t = v_{ref} = L_e\left(\frac{di_{ref}}{dt} + \Delta_s\right) + v_s \tag{4}$$

In the case depicted in FIG. 6(*b*), the output current is higher than the upper limit ($i>i_{ref}+hy$) and needs to be reduced towards the lower limit. In this case, the rate of change of reference current can be reduced by the amount $\Delta_s$ as shown in formula (5).

$$v_t = v_{ref} = L_e\left(\frac{di_{ref}}{dt} - \Delta_s\right) + v_s \tag{5}$$

Similarly, FIGS. 6(*c*) and (*d*) depict the situations when the reference current $i_{ref}$ has a negative slope. Again, the required MMC output voltage $v_t$ can be calculated from formula (4) for the situation in FIG. 6(*c*) and from formula (5) for the case in FIG. 6(*d*). Please note that the recalculation of the output voltage based on formulae (4) and (5) only occurs when the measured current breaches the upper or lower limit at a sampling instance, otherwise, the output voltage is kept at the same value.

The value of the slope deviation parameter $\Delta_s$ can either be a pre-selected constant or be changed dynamically during operation if more precision is required. Some embodiments may have only a singular mode of operation, in which the slope deviation parameter is either a constant value applied uniformly at any sampling intervals where slope adjustment is required, or is a dynamically variable value calculated uniquely for each such instance. In other embodiments, the controller may be configured to enable switching between two different modes of operation that differ from one another in terms of the constant versus variable character of the slope deviation parameter.

In a mode or embodiment employing a constant value the slope deviation parameter $\Delta_s$, the slope deviation $\Delta_s$, is fixed to a pre-set constant of non-zero positive value, with a recommended upper limit of (2×hy)/Δt. Referring to FIG. 6A for example, if the value of the slope deviation is too small, the output current may undershoot its intended correction without reaching the prescribed hysteresis range, as seen of the less inclined of the two dashed correction trajectory arrows of FIG. 7. Such undershot failure of the attempted correction denotes the need for a larger $\Delta_s$. However, if the slope deviation parameter is assigned too large a value, the output current may overshoot the prescribed hysteresis range, as illustrated by the more inclined of the two dashed correction trajectory arrows of FIG. 7.

In a mode or embodiment instead employing a variable value for the slope deviation parameter $\Delta_s$, better tracking of the output current is achieved, but the controller implementation is somewhat more complex. In this strategy, $\Delta_s$ is a dynamically calculated variable that is proportional to the magnitude of the error between the output and reference currents $|i-i_{ref}|$. Thus, when the error is large, the value of the $\Delta_s$ will be increased so that in the next timestep the current will change faster.

Figure 8:
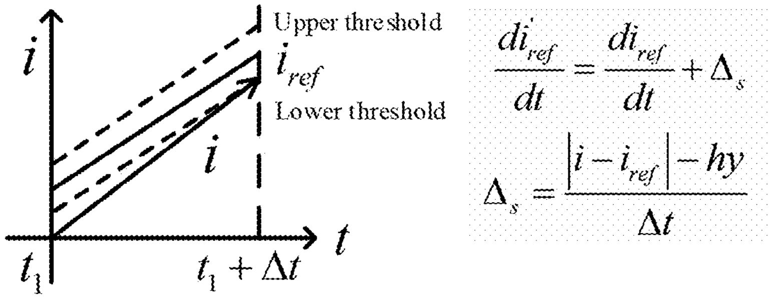
FIG. 8 schematically illustrates successful correction of the scenario shown in FIG. 6(A) using an appropriate amount of reference current slope adjustment, using a variable slope deviation parameter in this illustrated instance.

FIG. 6A is taken as an example to deduce the value of slope deviation $\Delta_s$. Assume that at $t=t_1$, the output current is below the prescribed hysteresis range and thus is unacceptable. Therefore, the slope $\Delta_s$ is increased to $(|i-i_{ref}|-hy)/\Delta t$, so that the current i rises at a faster rate to re-enter the acceptable deviation envelope ($i_{ref} \pm hy$) more quickly, as shown in FIG. 8. The precision of this hysteresis current control method can be increased by decreasing the value of 'hy' but doing so typically leads to more switching and hence additional power loss.

Demonstration of the Inventive Methodology

Figure 9:
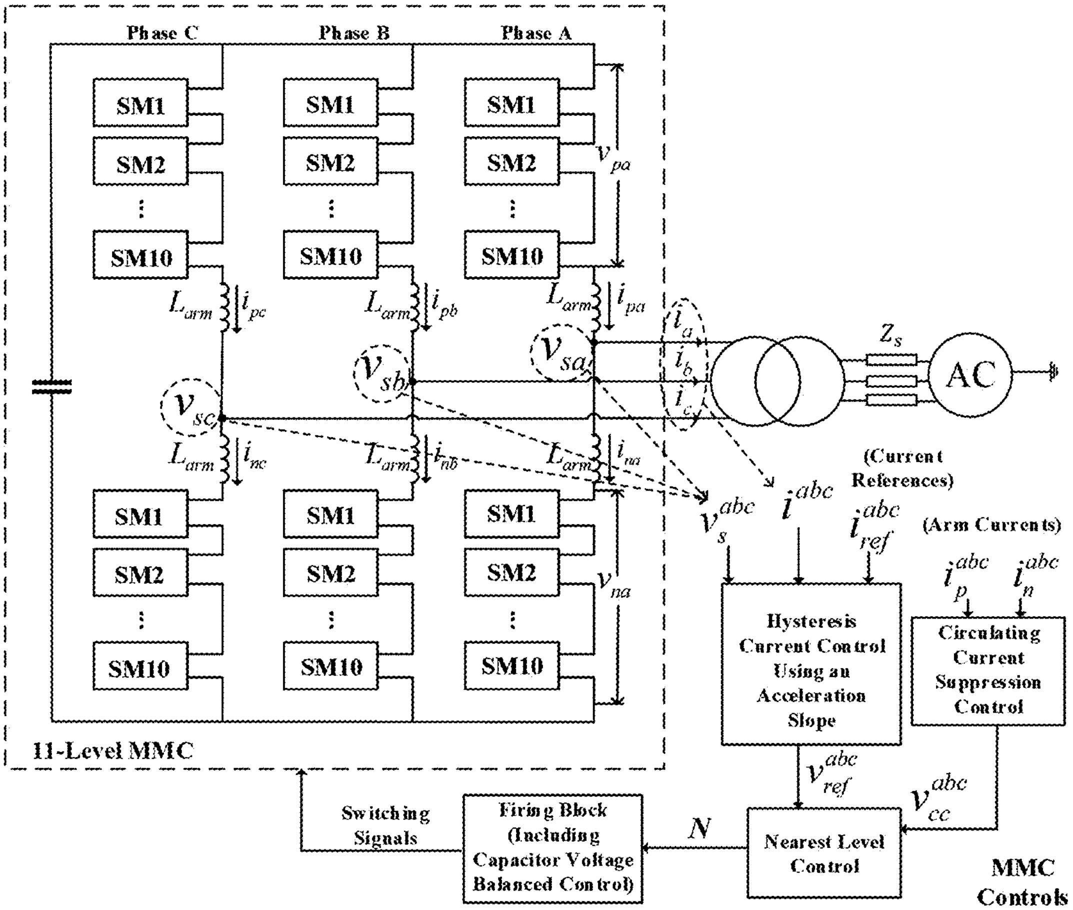
FIG. 9 is a schematic diagram illustrating implementation of a novel hysteresis current controller of the present invention on an otherwise conventional MMC.

The inventive hysteresis current control methodology is exemplified with a simple example of an eleven-level MMC shown schematically in FIG. 9. The MMC is connected to an external ac source through a transformer. The three-phase current references $$\left(i_{ref}^{abc}\right),$$

measurements of the output currents ($i^{abc}$) and MMC output voltages $$\left(v_s^{abc}\right)$$

are the required inputs to the hysteresis current controller to generate the voltage references $$\left(v_{ref}^{abc}\right).$$

The proposed current control action can be superimposed on the existing controllers required for proper MMC operation such as capacitor balancing, circulating current suppression (CCSC) and so on. In an MMC, harmonic currents of even frequencies (dominantly second harmonic) may circulate between the legs, and these do not enter the ac network. A CCSC is therefore commonly employed to cancel the circulating currents by injecting compensating voltages $$\left(v_{cc}^{abc}\right).$$

The final output voltage orders/commands for each phase are generated by summing the $$v_{ref}^{abc} \text{ and } v_{cc}^{abc}.$$

The MMC's voltage control block then selects the appropriate number 'N' of submodules to activate in each arm using an algorithm such as "nearest level control" (NLC) [8] to achieve the ordered/commanded output voltage of each phase.

Modern power grids are being increasingly impacted by the proliferation of power-electronics-based apparatus which can introduce distortion and unbalances and thus degrade power quality [22]. To mitigate the distortion, the conventional solution is to use passive LC filters which exhibit good robustness, reliability, and low cost [23]. However, they usually target specific frequencies and can become detuned as components age. A more effective and increasingly popular solution is the use of active power filters (APFs) or active power line conditioners [24]. These are usually implemented with a two-level VSC topology in hysteresis current control as discussed herein above, while the present invention instead implements novel hysteresis current control in MMCs and has been demonstrated to have operational effectiveness.

Figure 10:
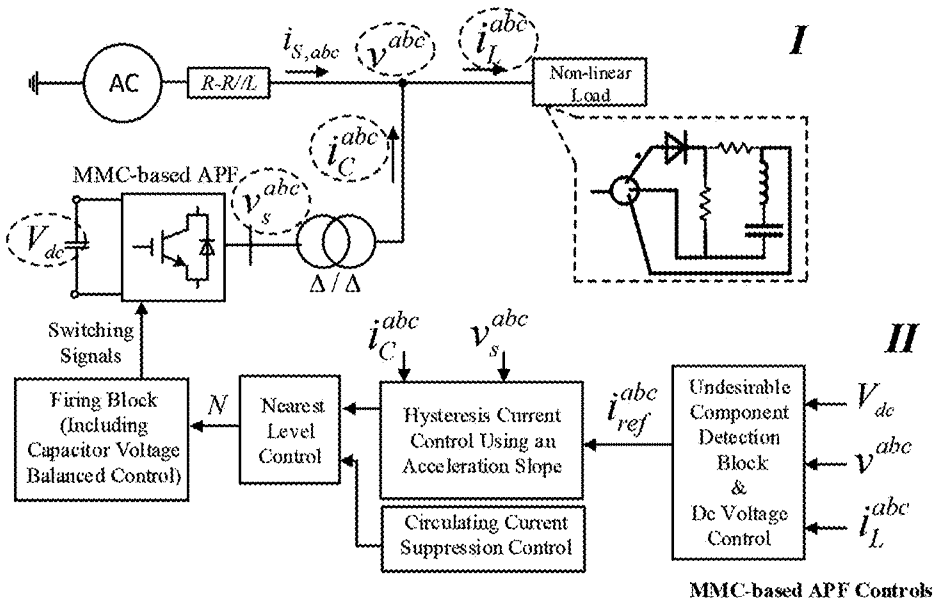
FIG. 10 is a schematic diagram illustrating implementation of the MMC and hysteresis current controller of FIG. 9 into an active power filter (APF) system.

A simple single-line view MMC-based APF with its controller is shown in FIG. 10. The ac system (represent by an ac voltage source and a Thevenin equivalent impedance) is connected to a non-linear passive load (consisting of R, L, C and diode elements). The MMC-based APF is shunt connected to the network through a transformer. The APF controller has an 'undesirable component' detection block and a dc voltage controller as shown in FIG. 11 [25]-[26].

The controllers are implemented in direct-quadrature (dq) coordinates (a.ka. Park's coordinates). The transformation angle (θ) used in the abc-dq transformation is measured by a phase locked loop (PLL) block with the positive sequence of phase 'a' of system voltage ($v^a$) as the θ=0 origin. The d- and q-axis components ($i_{Ld}$ and $i_{Lq}$) of the load currents $$\left(i_L^{abc}\right)$$

are usually constant, however, these would have additional components when the load currents are unbalanced. Subtracting the long-term averages ($i_{Ld,av}$ and $i_{Lq,av}$) from $i_{Ld}$ and $i_{Lq}$ gives the contributions to the load currents from negative sequence and harmonics components. These are the undesirable components of the load currents and should be targeted for elimination by the MMC-based APF.

Figure 11:
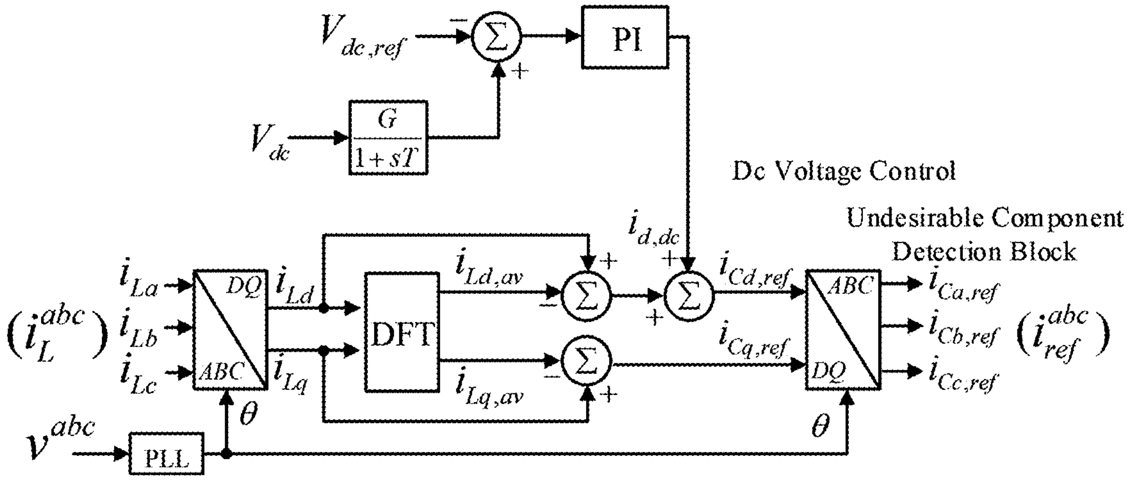
FIG. 11 is a schematic diagram illustrating an "undesirable component" detection block and a dc voltage controller of the MMC-based APF system of FIG. 10.

In addition, some other supplementary control functions have to be added, such as the regulation of the dc voltage via the signal $i_{d,dc}$ as shown in FIG. 11. Finally, the dq components ($i_{Cd,ref}$ and $i_{Cq,ref}$) are converted back to abc coordinates ($i_{Ck,ref}$, k∈[a, b, c]), and then supplied the current references to the proposed hysteresis current control to regulate the output current of the MMC-based APF $$\left(i_C^{abc}\right).$$

Thus, the unwanted components of the load currents $$\left(i_L^{abc}\right)$$

can be cancelled by the compensation currents from the MMC to ensure that the system currents $$\left(i_S^{abc}\right)$$

are balanced and harmonics-free. The MMC control blocks still must retain additional controls for circulating current suppression, capacitor balancing and so on.

The proposed MMC-based APF system was tested first using the Electromagnetic Transients (EMT) simulation and then constructed in physical hardware, as discussed further below. The hardware version was validated by the hardware-in-the-loop (HIL) testing on a real-time power system simulator (RTDS).

Validation of Approach Using Electromagnetic Transients Simulation

The inventive MMC hysteresis control method was simulated using the EMT simulation program (PSCAD/EMTDC). The validation system layout is the same as in FIG. 9, and its main parameters are in Table I.

TABLE I

Main Parameters of System

| Parameter | Value |
|---|---|
| Number of submodules per arm | 10 |
| MMC dc side voltage | ±5 kV |
| MMC arm inductance | 2 mH |
| Transformer voltage | 5.6/10 kV |
| Transformer three-phase MVA | 25 MVA |
| Transformer leakage inductance | 0.15 pu |
| Ac system voltage (l − l, RMS) | 10 kV |
| Ac system short circuit ratio (SCR) | 4.5 |
| Half of hysteresis band 'hy' | 0.01 pu |
| Selection of the slope deviation | Variable value |

Figure 12A:
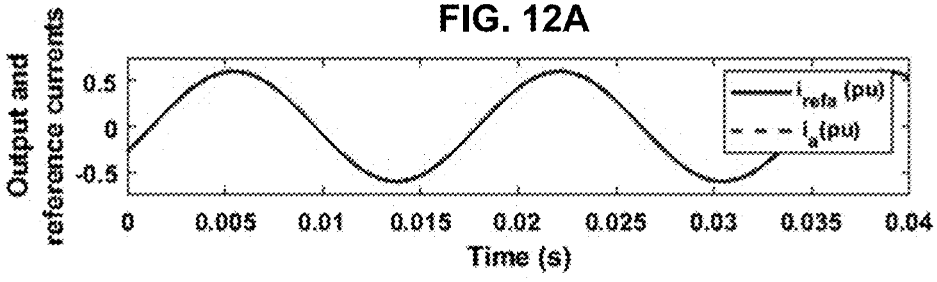
FIG. 12A is a waveform plot of both the output and reference current signals for one phase of the inventively modified MMC of FIG. 9.
Figure 12B:
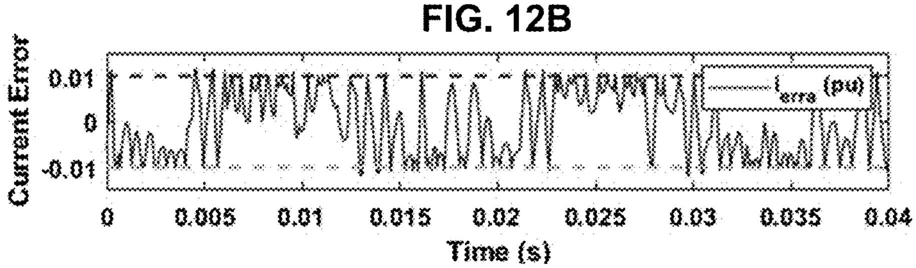
FIG. 12B is a waveform plot of the current error (difference between the output current and the reference current) for the same one phase as FIG. 12A.
Figure 12C:
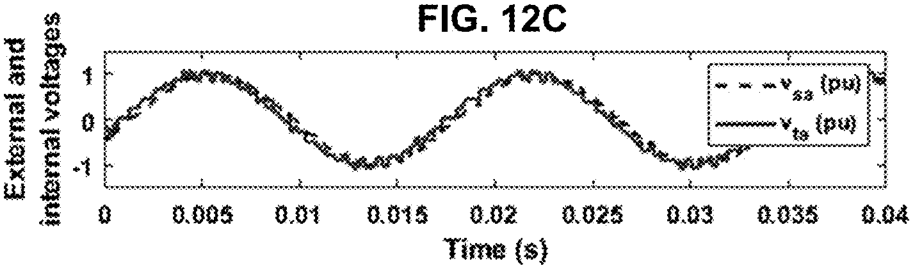
FIG. 12C is a waveform plot of internal and external voltages for the same one phase as FIGS. 12A and 12B.

FIG. 12A shows the phase 'a' output current $i_a$ (dotted line) and its corresponding reference current $i_{refa}$ (solid line), which is a 60 Hz sinewave with peak amplitude 0.6 pu. The other two phase references $i_{refb}$ and $i_{refc}$ (not shown) are similar but have ±120° phase shift to form a balanced 3-phase set. As is evident, the method works well, because the two waveforms are virtually identical, with the difference $i_{erra}$ being within the desired ±0.01 pu hysteresis band as seen from FIG. 12A. FIG. 12C shows the phase 'a' voltage $v_{sa}$ on the system side (dotted line) and the phase 'a' internal voltage $v_{ta}$ from (1) (solid line). Phase 'b' and 'c' waveforms (not shown) are similar, and phase displaced by ±120°.

At any switching instant, the MMC controller inserts/removes usually only one or at most two submodules as can be seen by observing the $v_{ta}$. Thus, the change in output voltage is only a fraction of that in the two-level converter where each switching results in a change in voltage equal to the full dc voltage. This is the reason for the MMC's lower switching power loss and fewer harmonics components.

Figure 13A:
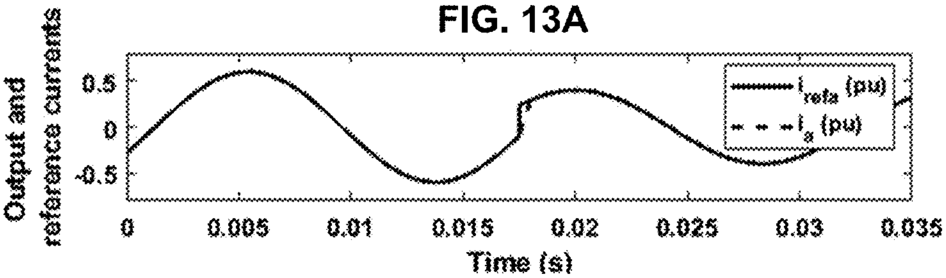
FIG. 13A is a waveform plot of both the output and reference current signals for one phase of the inventively modified MMC of FIG. 9, illustrating effective correction of the output current by the inventive hysteresis controller in the event of a radical change to the reference current.
Figure 13B:
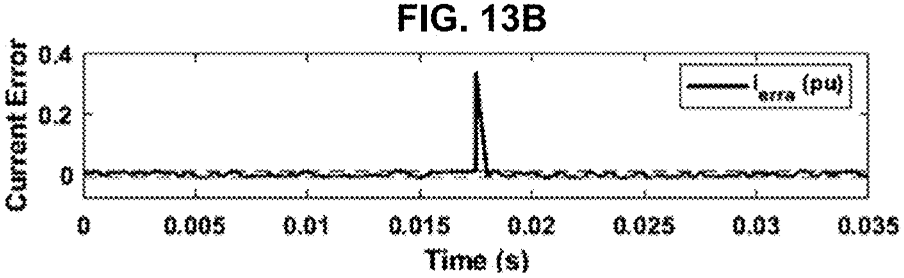
FIG. 13B is a waveform plot of the current error (difference between the output current and the reference current) for the same one phase as FIG. 13A.
Figure 13C:
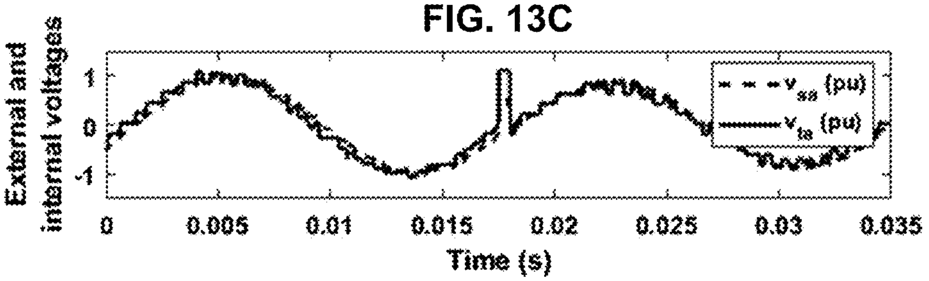
FIG. 13C is a waveform plot of internal and external voltages for the same one phase as FIGS. 13A and 13B.

FIG. 13 shows the dynamic response of the MMC with the proposed controller, after a sudden change of the magnitude of the $i_{refa}$ from 0.6 pu to 0.4 pu simultaneously accompanied by a 45° phase shift. The output current $i_a$ is seen to follow the reference current and rapidly attain the new equilibrium operating point, with only a small transient error of about 0.3 pu at the point of change, showing that the proposed hysteresis current control method has good dynamic response. The high $i_{erra}$ just after the reference current sudden change is attributed to the voltage of the MMC ($v_{ta}$) reaching its ceiling limitation as shown in FIG. 13C, which means all the submodules of the lower arm are active. In this case, the output current slope also reaches the maximum controllable value. This error decreases for a larger MMC dc side voltage.

Converter Power Loss Evaluation

In order to show the advantage of the inventive approach, its estimated power loss is compared with that of traditional hysteresis current control on a two-level VSC. The converter power loss can be divided into i) conduction loss, ii) blocking loss, and iii) switching loss.

The conduction loss is obtained by multiplying the on-state voltage by the on-state current. Similarly, the blocking loss can be computed by multiplying the off-state blocking voltage by the leakage current.

Figure 14:
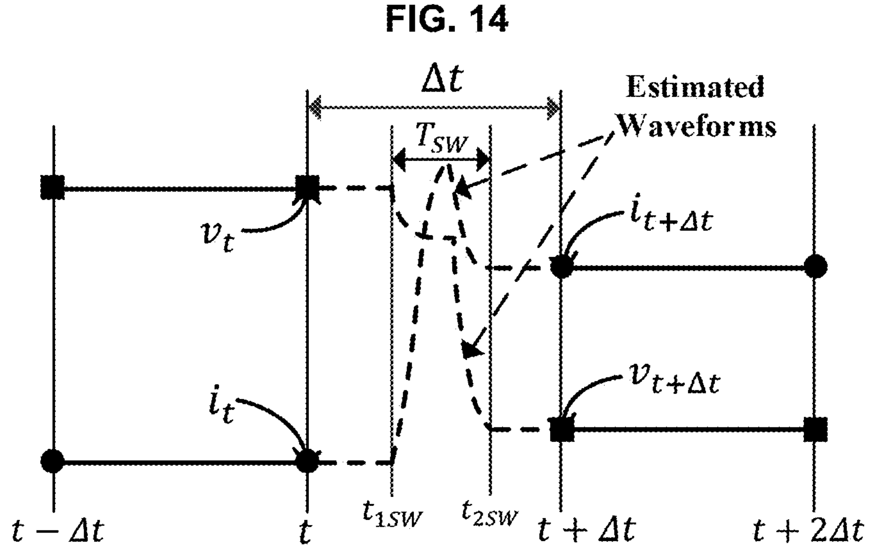
FIG. 14 is a plot of estimated voltage and current waveforms during a switching interval of a single insulated-gate bipolar transistor (IGBT) to demonstrate calculation of losses therein.

However, the determination of the switching losses poses a challenge, as the switching process typically lasts only a few tens of nanoseconds, and if simulated, would require using very small simulation timesteps. Hence, the approach in and [19] is utilized, where the pre- and post-switching voltages ($v_t$ and $v_{t+\Delta t}$) and currents ($i_t$ and $i_{t+\Delta t}$) of the device are obtained in the simulation using reasonable timesteps of the order a few microseconds. An approximate physics-based model is then used to estimate the voltage and current waveforms (the dotted lines) during the switching interval $T_{sw}$ as depicted in FIG. 14. The switching losses are estimated by multiplying the interpolated current and voltage waveforms and then averaged. In addition to the pre- and post-switching voltages and currents from the EMT simulation, the loss model also requires other datasheet information from the manufacturer to derive the model parameters for the power loss estimation.

Regarding power loss comparison between the inventively modified MMC and conventional two-level VSC, the power loss estimation was carried out for an eleven-level MMC with the proposed hysteresis current control and a two-level VSC with the traditional hysteresis current control [20]. For a fair comparison, the IGBTs in the MMC and two-level converter should have the same ratings. Hence the two-level converter used for comparison employs ten series IGBT modules per switch. Also, the external system, the sampling timestep, and the parameters of the controller for these two converters are the same to make a reasonable comparison. The MMC submodules were rated at 1 kV and were assumed to use the Toshiba ST1500GXH24 IGBT/diode modules with the datasheet in [27]. Table II summarizes the main data of the total power loss (sum of the switching, conduction and blocking losses).

TABLE II

Converter Power Losses Comparison

| Converter type | Control type | Output power (MW) | Total power loss (MW) |
|---|---|---|---|
| 11-level MMC with 10 submodules/Arm | Current sine wave output with proposed hysteresis current control | 14.7 | 0.24 (1.6%) |
| | Voltage sine wave output with NLC | 14.9 | 0.27 (1.7%) |
| Two-level VSC | Current sine wave output with traditional hysteresis current control | 14.5 | 2.10 (12.7%) |
| | Voltage sine wave output with pulse-wide modulation (1860 Hz carrier) | 14.5 | 0.86 (5.6%) |

From Table II, the two-level VSC with traditional hysteresis current controller has a loss of 12.7% which is over seven-times that of the eleven-level of the inventively modified MMC, whose loss comes in at only 1.6%. As expected, the benefit of the MMC circuit is the significant reduction in losses because each switching results in the output voltage changing over one or two capacitor levels, rather than over the full dc voltage as is the case for two-level VSC.

The losses obtained when the converters are operated to generate sinusoidal voltage outputs are also provided in Table II above. It should be noted that for a fair comparison, the modulation indices were adjusted so that the voltage waveforms have the same magnitudes as those observed in the current controlled options.

As can be seen, an MMC generating a sinusoidal ac voltage waveform would experience a loss of 1.7% which is essentially the same as the 1.6% with the proposed hysteresis current controller. In contrast, with a two-level VSC, the percentage loss is 5.6% when generating a sinusoidal ac voltage waveform but rises to 12.7% when it is used to generate the desired sinusoidal current. The result shows that, compared with the normal voltage control methods, the hysteresis current control does not increase the MMCs' loss.

Figure 15:
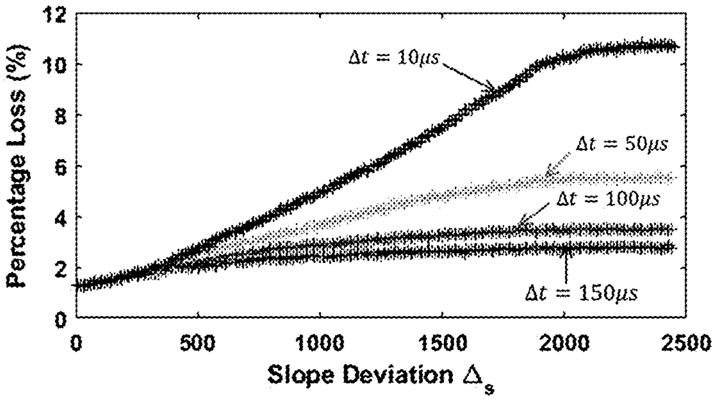
FIG. 15 is a plot of percentage power loss versus slope deviation values for time intervals of different length for the inventively controlled MMC of the present invention.

Regarding the influence of controller parameters on power loss, FIG. 15 shows the impact of the slope deviation parameter $\Delta_s$ and the sampling timestep $\Delta t$ to the percentage loss for the 11-level MMC as described in FIG. 9 and Table I.

As mentioned before, switching can only be conducted at the integer multiples of $\Delta t$, so a smaller $\Delta t$, will typically imply a larger power loss, although with a better waveform quality. It is because the MMC will respond to the current reference more precisely due to the high sampling frequency, thus, more switching action is required, and more switching loss accrues. If $\Delta_s$ is very large, then the MMC switches several submodules at each switching instant, and the behavior starts approaching that of a two-level VSC with its larger power loss. So, for any $\Delta t$, all the curves approach at a larger loss value as $\Delta_s$ increases. In addition, before this saturation point, the percentage loss of the MMC increases in a nearly linear relationship with $\Delta_s$ rising.

MMC-Based Active Power Filter Controller Validation and Hardware Implementation

Figure 16A:
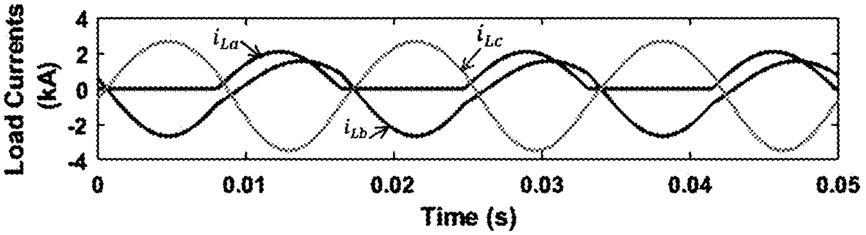
FIG. 16A is a waveform plot of three phase load currents from simulation of the MMC-based APF system of the present invention.
Figure 16B:
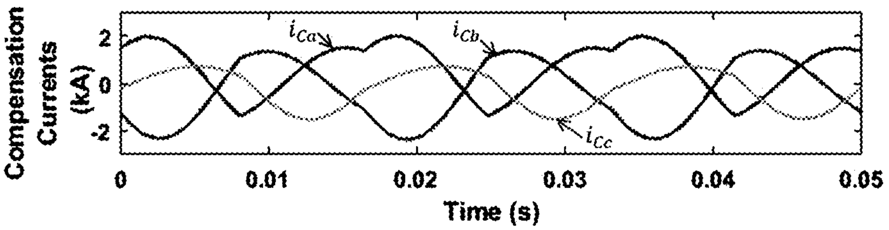
FIG. 16B is a waveform plot of three phase compensation currents from simulation of the MMC-based APF system of the present invention.
Figure 16C:
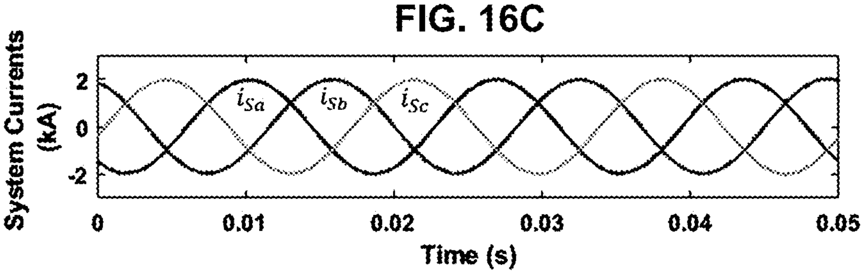
FIG. 16C is a waveform plot of three phase system currents from simulation of the MMC-based APF system of the present invention.

The inventive methodology is exemplified with a simple MMC-based APF. The single-line view was shown in FIG. 10 referenced above. FIG. 16 shows the EMT simulation results generated from the APF system. In FIG. 16A, the three-phase load currents $$i_L^{abc}$$

are unbalanced as well as distorted (i.e., non-sinusoidal). The MMC-based APF identifies the undesirable components in the phase currents $$i_L^{abc}$$

and injects the inverse currents $$i_C^{abc}$$

in FIG. 16B to cancel these. As a result, the currents $$i_S^{abc}$$

entering the connected network are balanced and sinusoidal as shown in FIG. 16C. This shows that the APF implemented with an MMC using the inventive hysteresis approach can ensure good power quality on the ac network side.

Figure 17:
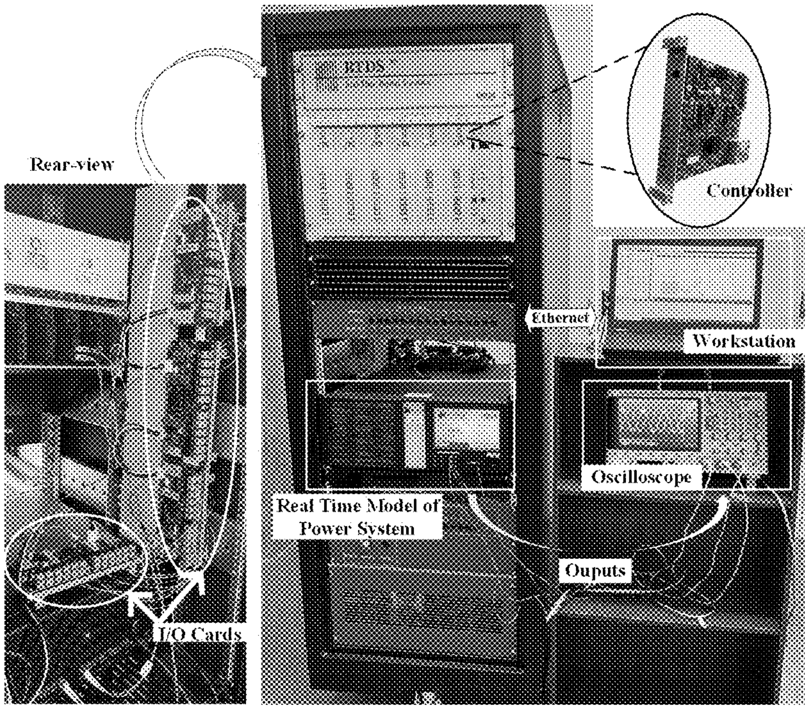
FIG. 17 shows a hardware-in-loop platform setup used for experimental validation of the present invention.
Figure 19:
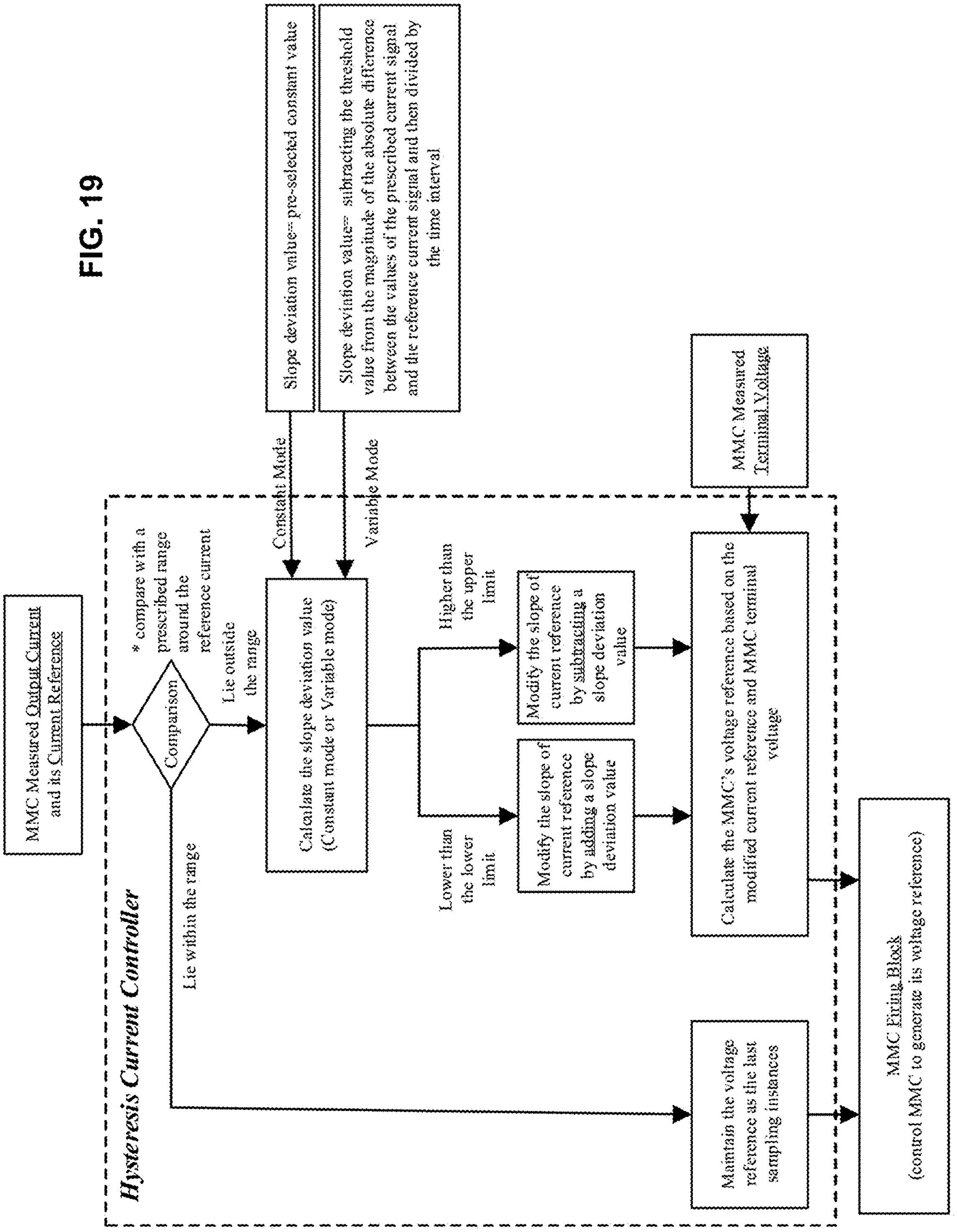
FIG. 19 is a flowchart of the inventive hysteresis control methodology of the present invention.

The effectiveness of the proposed hysteresis current control for MMC was also validated by experiments based on the hardware-in-loop platform setup shown in FIG. 17 for the simple APF example system in FIG. 10. The load was a combination of linear elements (resistance, inductance, and capacitance), and a non-linear element (diode) as shown in the figure. The electrical network, ac system, MMC and load (marked by Region I in FIG. 10) were modelled on the RTDS simulator (NovaCor) [28].

The controller (identified by Region II in FIG. 10) was physically implemented in hardware using two Freescale MC7448 RISC processors each operating at 1.7 GHz and programmed using a stripped-down version of the C language (C-builder) and generated the number of module orders for the MMC. The controller card was slotted into the same rack as an earlier version (PB5) of the RTDS platform [28], which made it easier to interconnect with the RTDS. As would be the case in a field implementation, the physical controller takes in analog measurement signals. Proprietary Giga-Transceiver Input/Output (GTIO) [28] cards were used to appropriately condition the input and outputs including digital to analog (D/A) or analog to digital (A/D) converters when connecting the physical controller to the real-time digital simulator.

FIG. 18 shows the HIL experimental results of the MMC-based APF. The signals are as seen by the physical controller, and so are analog quantities plotted on an oscilloscope. The experiment shows that the hardware controller is able to command the MMC to produce compensation currents $$(i_C^{abc})$$

which indeed cancel the unbalanced and harmonics components of the load currents $$(i_L^{abc})$$

to guarantee the three-phase system currents $$(i_S^{abc})$$

to be balanced and harmonics-free.

In summary, a new hysteresis methodology to control the MMC output currents using an acceleration slope strategy was developed and implemented. The successful operation of the proposed hysteresis current control was validated in offline testing using Electromagnetic Transients simulation (PSCAD/EMTDC program) and hardware-in-loop experiment (Real-time Digital Simulator). Power loss estimate calculations were carried out for the losses in the IGBTs and diodes. The results show that the MMC with the proposed hysteresis current control has a power loss which is significantly less than that in a two-level VSC with traditional hysteresis current control and is essentially the same as when the MMC is used to generate sinusoidal ac voltages. Also, the power loss of the MMC increases with the smaller sampling timestep and larger value of the slope deviation.

An MMC-based active power filter was investigated as an application example of the proposed hysteresis current control method. The EMT simulation was used to develop the concept and select feasible controller parameters, after which the controller was physically constructed and tested in a HIL environment with the electrical network part implemented on a real-time simulator. Both the EMT simulation and HIL experiment prove that the MMC-based APF can indeed inject currents into the system to cancel the unbalanced and harmonics component of the system currents to improve the power quality.

Since various modifications can be made in the invention as herein above described, and many apparently widely different embodiments of same made, it is intended that all matter contained in the accompanying specification shall be interpreted as illustrative only and not in a limiting sense.

The invention claimed is:

1. A method for controlling a modular multilevel voltage sourced converter (MMC) to form an outputted alternating current (AC) current signal of prescribed form, wherein the MMC is electrically connected at an output port of the MMC to an input port of an AC electrical power system to facilitate exchange between the MMC and the AC electrical power system of electrical power derived from the outputted AC current signal, the method comprising:

providing a reference current signal to which the outputted AC current signal is to conform;

forming, at the output port of the MMC, based on the reference current signal, a voltage signal configured to form the outputted AC current signal;

measuring the outputted AC current signal at sampling instances separated by uniform time intervals;

at each one of the sampling instances, comparing a value of the outputted AC current signal to a prescribed range whose upper and lower limits straddle a value of the reference current signal;

for each one of the sampling instances for which it is found that the value of the outputted current signal lies within the prescribed range, maintaining the voltage signal from a respectively preceding one of the time intervals;

for each one of the sampling instances for which it is found that the outputted AC current signal is below the lower limit of the prescribed range, increasing a current/time slope of the reference current signal by applying a slope deviation value to the reference current signal, independent of converter switching state selection, to thereby derive a modified reference current signal, and modifying the voltage signal based on the modified reference current signal;

for each one of the sampling instances for which it is found that the outputted AC current signal exceeds the upper limit of the prescribed range, decreasing the current/time slope of the reference current signal by applying the slope deviation value to the reference current signal, independent of converter switching state selection, to thereby derive the modified reference current signal, and modifying the voltage signal based on the modified reference current signal.

2. The method of claim 1 wherein said increasing and said decreasing of the current/time slope of the reference current signal respectively comprise addition and subtraction of a constant slope deviation value to and from the current/time slope of the reference current signal, wherein the constant slope deviation value is applied uniformly among different sampling instances regardless of a magnitude of error between the outputted AC current signal and the reference current signal.

3. The method of claim 2 wherein the constant slope deviation value is a positive non-zero value not exceeding twice a threshold value of the prescribed range divided by the time interval.

4. The method of claim 1 wherein said increasing and said decreasing of the current/time slope of the reference current signal respectively comprise addition and subtraction of a variable slope deviation value to and from the current/time slope of the reference current signal.

5. The method of claim 4 wherein the variable slope deviation value is proportional to a magnitude of an error between the outputted AC current signal and the reference current signal at the sampling instance, the error being defined as a difference between the value of the outputted AC current signal and the value of the reference current signal.

6. The method of claim 5 wherein the slope deviation value is equal to a difference calculated by subtracting a threshold value of the prescribed range from an absolute value of said error, a result of which is then divided by the time interval.

7. A hysteresis current controller for a modular multilevel voltage sourced converter (MMC) that is electrically connected at an output port of the MMC to an AC electrical power system at an input port thereof to facilitate exchange between the MMC and the AC electrical power system of power derived from an outputted AC current signal, said hysteresis current controller being configured to:

measure the outputted AC current signal at sampling instances separated by uniform time intervals;

at each one of the sampling instances, compare a value of the outputted AC current signal against a prescribed range whose upper and lower limits straddle a reference current signal to which the outputted AC current signal is to be conformed; and for each of said sampling instances for which it is found that the value of the outputted AC current signal is outside the prescribed range, either increase or decrease a current/time slope of the reference current signal by adding or subtracting a slope deviation value to or from the current/time slope of the reference current signal, independent of converter switching state selection, according to whether the value of the outputted AC current signal falls below or above the prescribed range, respectively, thereby deriving a modified reference current signal; and, using said modified reference current, calculate a modified reference voltage to be imparted at the output port of the MMC to control the outputted AC current signal.

8. The controller of claim 7 wherein said slope deviation value is a constant slope deviation value applied uniformly among different sampling instances regardless of a magnitude of error between the outputted AC current signal and the reference current signal at said different sampling instances.

9. The controller of claim 8 wherein the constant slope deviation value is a positive non-zero value not exceeding twice a threshold value of the prescribed range divided by the time interval.

10. The controller of claim 7 wherein the slope deviation value is a variable slope deviation value uniquely calculated for each of said sampling instances for which it is found that the value of the outputted AC current signal is outside the prescribed range.

11. The controller of claim 10 wherein the variable slope deviation value is proportional to a magnitude of an error between the outputted AC current signal and the reference current signal at the sampling instance.

12. The controller of claim 11 wherein the slope deviation value is equal to a difference calculated by subtracting a threshold value of the prescribed range from an absolute value of said error, a result of which is then divided by the time interval.

* * * * *